(12) United States Patent
Ek et al.

(10) Patent No.: US 8,372,499 B2
(45) Date of Patent: Feb. 12, 2013

(54) PRESSURELESS PIPE COMPRISING A MULTIMODAL POLYETHYLENE COMPOSITION WITH AN INORGANIC FILLER

(75) Inventors: Carl-Gustaf Ek, Västra Frölunda (SE); Mats Bäckman, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 1084 days.

(21) Appl. No.: 12/064,088

(22) PCT Filed: Aug. 2, 2006

(86) PCT No.: PCT/EP2006/007666
§ 371 (c)(1),
(2), (4) Date: Apr. 28, 2008

(87) PCT Pub. No.: WO2007/031155
PCT Pub. Date: Mar. 22, 2007

(65) Prior Publication Data
US 2008/0233322 A1  Sep. 25, 2008

(30) Foreign Application Priority Data
Sep. 15, 2005 (EP) .................................. 05020166

(51) Int. Cl.
*B29D 22/00* (2006.01)
*B29D 23/00* (2006.01)
*B32B 1/08* (2006.01)

(52) U.S. Cl. .................. 428/36.9; 428/35.7; 428/36.92; 428/500; 525/240; 525/324; 138/178

(58) Field of Classification Search ................ 428/35.7, 428/36.9, 36.91, 36.92, 500; 525/240, 324; 138/178
See application file for complete search history.

(56) References Cited

U.S. PATENT DOCUMENTS 6,362,252 B1   3/2002   Prutkin
6,822,051 B2   11/2004  Harris
(Continued)

FOREIGN PATENT DOCUMENTS

EP   0 517 868   11/1995
EP   1 584 852   10/2005
(Continued)

OTHER PUBLICATIONS

International Search Report for International Application No. PCT/EP2006/007666.
(Continued)

*Primary Examiner* — Michael C Miggins
(74) *Attorney, Agent, or Firm* — Fay Sharpe LLP

(57) ABSTRACT

The present invention relates to a pipe or a supplementary pipe article comprising a polyethylene composition comprising a base resin which comprises (A) a first ethylene homo- or copolymer fraction, and (B) a second ethylene homo- or copolymer fraction, wherein fraction (A) has a lower average molecular weight than fraction (B), the base resin has a flexural modulus determined according to ISO 178 of 1000 MPa or higher, and the composition further comprises (C) an inorganic mineral filler, wherein inorganic mineral filler (C) is present in the composition in an amount of 1 to 70 wt. %, and to the use of said composition for the production of a pipe or a supplementary pipe article.

20 Claims, 1 Drawing Sheet

U.S. PATENT DOCUMENTS

| | | |
|---|---|---|
| 2002/0045711 A1 | 4/2002 | Backman et al. |
| 2003/0113496 A1 | 6/2003 | Harris et al. |
| 2004/0054088 A1 | 3/2004 | Kazakov et al. |
| 2004/0266966 A1 | 12/2004 | Schramm et al. |

FOREIGN PATENT DOCUMENTS

| | | |
|---|---|---|
| WO | WO2006/132747 A1 | 12/2006 |

OTHER PUBLICATIONS

European Search Report for Application No. EP 05 02 0166.
Schiers, John et al., *PE100 Resins for Pipe Applications*, 1006 Elsevier Science Ltd., Dec. 1996.
Notice of opposition to a European patent, Patent No. 1764389, dated Feb. 18, 2009, 20 pgs.
Correspondence from Kador & Partner to EPO regarding further to formal reply dated May 10, 2009, 9 pgs.
Plastics—Polyethylene (PE) moulding and extrusion materials—Part 2: Preparation of test specimens and determination of properties; Dansk Standard, DS/EN ISO 1872-2; Jun. 10, 1997, 6 pgs.
Plastics—Polyethylene (PE) moulding and extrusion materials—Part 2: Preparation of test specimens and determination of properties, International Standard, ISO 1872-2, Second edition, Apr. 1, 1997, 8 pgs.
Plastics—Determination of flexural properties, International Standard, ISO 178, Fourth edition, Dec. 15, 2001, 20 pgs.

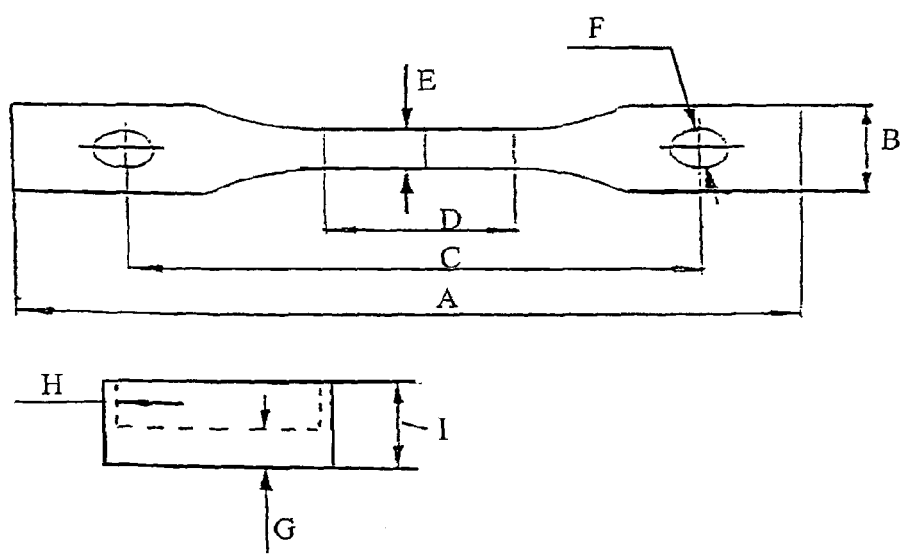

PRESSURELESS PIPE COMPRISING A MULTIMODAL POLYETHYLENE COMPOSITION WITH AN INORGANIC FILLER

The present invention relates to a pipe, in particular a pipe for the transport of non-pressurised fluids, comprising a polyethylene composition including a polyethylene base resin and an inorganic mineral filler. Furthermore, the present invention relates to the use of said composition for the production of a pipe.

Polyethylene compositions are frequently used for the production of pipes due to their favourable physical and chemical properties as e.g. mechanical strength, corrosion resistance and long-term stability. The fluids transported in the pipes may be pressurized, such as when tap water or natural gas is transported, or not pressurized such as when the pipe is used for transporting sewage (waste water), for drainage applications (land and road drainage), for transporting storm water or indoor soil and waste. The fluid transported in a pipe may have varying temperatures, usually within a range of 0° C. to 50° C.

The present invention relates in particular to pipes for the transport of non-pressurized fluids. Such pipes are usually denoted as "pressureless pipes". Pressureless pipes may also be used for cable and pipe protection.

Different requirements are imposed on pipes for the transport of pressurized fluids (so-called pressure pipes) and pressureless pipes. While pressure pipes must be able to withstand an internal positive pressure, pressureless pipes do not have to withstand such a pressure, but are required to withstand an external positive pressure. The higher outside pressure may be due to the earth load on a pipe when submerged in the soil, the groundwater pressure, traffic load, or clamping forces in indoor applications.

Pressureless pipes today are made in a variety of dimensions from about 0.1 to about 3 m diameter and of a variety of different materials such as ceramics (vitrified clay mainly), concrete, PVC, polyethylene and polypropylene. While ceramics and concrete are low-cost materials, they are heavy and brittle. Thus, there has been a tendency to replace these materials by polymeric materials including polyethylene compositions.

Pressureless pipes made of polyethylene compositions must fulfil at least two fundamental criteria. Firstly, and very importantly, they must show sufficient stiffness to withstand external pressure without the "help" from internal counter-pressure. As a measure for the stiffness of a material may serve its flexural modulus. In this regard, by using a material with higher stiffness it is possible to either use less material and keep the same stiffness of the pipe or, alternatively, in order to have a higher resistance to external pressure, the ring stiffness can be increased by using the same or a higher amount of material in the pipe.

It is known that the stiffness of a polyolefin material can be increased by addition of an inorganic (mineral) filler, but in this regard it must be considered that a number of other important properties may suffer from such filler addition, mainly due to the lack of interaction between the filler and the matrix. It is also known that polyethylene is more sensitive in this regard than polypropylene.

For example, mineral filled polyethylene usually is suffering from insufficient long term properties. This effect is, for example, seen in pressure testing and in Constant Tensile Load (CTL) testing at high temperatures, and/or at high elongations/deflections and/or at longer times.

Furthermore, mineral filled polyethylene usually is suffering from a considerable drop in impact properties, especially at lower temperatures.

A second main criterion for a pipe material is that it must not fail in a brittle manner in a slow crack growth propagation (SCG) test. However, SCG resistance and stiffness are two contradictory properties, i.e. in principle, the higher the flexural modulus of a material, the more it will be prone to SCG.

Still further, especially for polyethylene compositions used for pressureless pipes a sufficiently high creep resistance is required. This is in order for the pipe or pipe system to withstand external loads during long times, e.g. soil pressure in underground applications or clamping and/or gravitational forces for indoor solutions.

The creep resistance is often measured as the creep modulus at a specific time, e.g. extrapolated to a 50 year value as in DIN 19537 (1988).

Alternatively, the creep resistance can be measured as the creep ratio, as a creep modulus measured at short times divided by a corresponding creep modulus at long times, for example according to ISO 9967. Consequently, a low creep ratio corresponds to high creep resistance (based on the creep result at short times).

Finally, the polymer composition used for the pipe must also show good weldability because pipe systems are usually built up by welding or fusion, either as general jointing method between pipe system parts or jointing between layers, for example in multilayer pipe structures e.g. butt fusion, electro fusion, spin welding (friction welding) and hand or automated welding with additional welding materials. Thus, it is important that the composition used must show a certain minimum weld strength. It is known that especially for filled polymer compositions weld strength is usually poor.

In view of all the requirements described above, it is the object of the present invention to provide a pressureless pipe made of a polyethylene composition which has an improved combination of properties, in particular which has an increased stiffness while retaining a) good long term properties, such as seen in pressure and CTL testing, b) good creep ratio, i.e. providing sufficient or superior creep resistance, c) sufficient impact properties, in particular at low temperatures, d) good crack propagation resistance, and e) acceptable weldability.

The present invention is based on the surprising finding that the above mentioned objects can be achieved by a polyethylene composition comprising a multimodal, preferably bimodal, polyethylene base resin with a certain stiffness, usually above 1000 MPa, and an inorganic (mineral) filler. This finding is all the more surprising because it has hitherto been considered impossible that a polyethylene comprising a (mineral) filler would have sufficient long-term properties, impact properties and crack propagation resistance so that it can be used as a pressureless pipe material.

Accordingly, the present invention provides a pipe or a supplementary pipe article comprising a polyethylene composition comprising a base resin which comprises (A) a first ethylene homo- or copolymer fraction, and
(B) a second ethylene homo- or copolymer fraction, wherein fraction (A) has a lower average molecular weight than fraction (B), the base resin has a flexural modulus determined according to ISO 178 of 1000 MPa or higher, and the composition further comprises (C) an inorganic mineral filler, wherein inorganic mineral filler (C) is present in the composition in an amount of 1 to 70 wt. %.

It has been found that the pressureless pipes according to the invention have a significantly increased stiffness as shown by their flexural modulus while, simultaneously, they retain good long term properties, low creep, a high crack propagation resistance as concerns both rapid and slow crack propagation, sufficient impact strength, and good weldability.

It should be noted that the composition used for the pipes of the present invention is characterised not by any single one of the above defined features, but by their combination. By this unique combination of features it is possible to obtain pressureless pipes of superior performance.

The term molecular weight where used herein denotes the weight average molecular weight $M_w$. This property may either be used directly, or the melt flow rate (MFR) may be used as a measure for it.

The term "base resin" denotes the entirety of polymeric components in the polyethylene composition according to the invention. Preferably, the base resin is consisting of fractions (A) and (B), optionally further comprising a prepolymer fraction in an amount of up to 20 wt %, preferably up to 10 wt %, more preferably up to 5 wt % of the total base resin.

In addition to the base resin and the inorganic mineral filler (C), usual additives for utilization with polyolefins, such as pigments (for example carbon black), stabilizers (antioxidant agents), antacids and/or anti-UVs, antistatic agents and utilization agents (such as processing aid agents) may be present in the polyethylene composition. Preferably, the amount of these additives is 10 wt % or below, further preferred 8 wt % or below, of the total composition.

Preferably, the composition comprises carbon black in an amount of 8 wt % or below, further preferred of 1 to 4 wt %, of the total composition.

Further preferred, the amount of additives different from carbon black is 1 wt % or less, more preferably 0.5 wt % or less.

Where herein the term "pipe" is used it is meant to comprise pipes as well as all supplementary parts for pipes such as fittings, valves, chambers and all other parts which are commonly necessary for a piping system.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In a preferred embodiment of the pipe of the invention, the composition has a $MFR_5$ of 0.1 to 2.0 g/10 min, more preferably of 0.2 to 1.5 g/10 min, still more preferably of 0.3 to 1.3 g/10 min, and most preferably of 0.4 to 1.0 g/10 min.

Further preferred, the composition has a $MFR_{21}$ of 2 to 50 g/10 min, more preferably of 5 to 30 g/10 min, and most preferably of 6 to 20 g/10 min.

The flow rate ratio $FRR_{21/5}$ of the composition which is indicative for the broadness of the molecular weight distribution of a polymer preferably is from 15 to 60, more preferably from 30 to 50.

The pipe according to the invention has a significantly improved stiffness as compared to prior art materials, mainly due to the presence of inorganic filler in the polyethylene composition. Accordingly, the composition used for the pipe of the invention preferably has a flexural modulus determined according to ISO 178 of more than 1400 MPa, more preferably of more than 1600 MPa, still more preferably of more than 1800 MPa and most preferably of more than 2000 MPa.

Usually, the composition has a flexural modulus of 4000 MPa or below, typically of 3500 MPa or below.

Furthermore, the flexural modulus of the base resin preferably is 1100 MPa or more, more preferably is 1150 MPa or more, and most preferably is 1200 MPa or more.

Furthermore, the composition preferably has a slow crack propagation resistance of at least 1.5 h at 4.6 MPa hoop stress and 9.2 bar internal pressure at 80° C. measured according to EN 13479, more preferably of at least 10 h, still more preferably of at least 50 h, and most preferably of at least 165 h, and most preferably of at least 500 h.

Usually, the resistance to slow crack growth is up to 1000 hours, more preferably up to 1500 hours.

It is preferred that a pipe made from the composition according to the invention has a time to failure in the CTL test of at least 1.5 h, more preferably at least 10 h, still more preferably at least 50 h, still more preferably at least 165 h, and most preferably at least 400 h.

Still further, the impact resistance of the pipes of the invention is still sufficiently high in spite of the incorporation of the inorganic filler.

The composition thus preferably has a Charpy Impact Strength at 23° C. of more than 2 $kJ/m^2$, more preferably of more than 4 $kJ/m^2$. Usually, the Charpy Impact Strength at 23° C. is 100 $kJ/m^2$ or below.

Furthermore, the composition preferably has a Charpy Impact Strength at 0° C. of more than 2 $kJ/m^2$, more preferably of 4 $kJ/m^2$. Usually, the Charpy Impact Strength at 0° C. is 80 $kJ/m^2$ or below.

Still further, the composition preferably has a creep resistance measured according to EN ISO 9967 as the long term creep ratio E(1 hour)/E(2 years) of 4.5 or below, more preferably 4.0 ore below, still more preferably 3.7 or below and most preferably 3.5 or below.

The composition preferably has a creep resistance measured as a short term modulus and creep ratio measured according to DIN-Certco ZP 14.3.1 (former DIN 54852-Z4) of 4.5 or below, more preferably 4.0 ore below, still more preferably 3.7 or below and most preferably 3.5 or below. The short term creep ratio is here defined as the creep modulus after 1 min divided by the creep modulus after 200 h.

Furthermore, the composition preferably has a creep modulus after 200 h of 450 MPa or more, more preferably of 500 MPa or more, still more preferably of 600 MPa or more, still more preferably of 700 MPa or more, and most preferably of 800 MPa or more.

The weldability of the composition measured as the ratio of the weld strength of a welded portion with respect to that of the full material is preferably higher than 0.5, more preferably higher than 0.7, still more preferably higher than 0.8, still more preferably higher than 0.9 and most preferably higher than 0.95.

The weldability of the composition can also be measured as the ratio of strain at break of the welded portion with respect to that of the full material. This ratio preferably is higher than 0.2, more preferably is higher than 0.3, still more preferably is higher than 0.5, still more preferably is higher than 0.7, still more preferably is higher than 0.8, and most preferably is higher than 0.9.

In the composition used for the pipe according to the invention preferably inorganic mineral filler (C) is present in an amount of at least 5 wt. %, more preferably at least 8 wt. %, still more preferably at least 10 wt. %, and most preferably at least 12 wt. %.

Furthermore, in the composition inorganic filler (C) is present in an amount of at most 70 wt. %, more preferably of at most 50 wt. %. In particular as regards weld strength it is preferred that inorganic mineral filler (C) is present in an amount of at most 45 wt. %, more preferably of at most 30 wt. %, still more preferably at most 25 wt. %.

Filler (C) of the composition may comprise all inorganic mineral filler materials as known in the art. Filler (C) may also comprise a mixture of any such filler materials. Examples for such filler materials are oxides, hydroxides and carbonates of aluminium, magnesium, calcium and/or barium.

Preferably, filler (C) comprises an inorganic compound of a metal of groups 1 to 13, more preferred groups 1 to 3, still more preferred groups 1 and 2 and most preferred group 2, of the Periodic Table of Elements.

The numbering of chemical groups, as used herein, is in accordance with the IUPAC system in which the groups of the periodic system of the elements are numbered from 1 to 18.

Preferably, inorganic mineral filler (C) comprises a compound selected from carbonates, oxides and sulphates. Preferred examples of such compounds are calcium carbonate, talc, magnesium oxide, huntite $Mg_3Ca(CO_3)_4$, and hydrated magnesium silicate, and kaolin ("China clay"), with a particular preferred examples being calcium carbonate, magnesium oxide, hydrated magnesium silicate, and kaolin ("China clay").

Further preferred, the inorganic mineral filler has a weight average mean particle size of 25 micron or below, more preferably of 15 micron or below.

Preferably, only 2 wt % of the filler has a particle size of 30 microns or higher, more preferably of 25 micron or higher.

The purity of the filler preferably is 94% or higher, more preferably is 95% or higher and most preferably is 97% or higher.

In a preferred embodiment in which $CaCO_3$ is used as filler, preferably the particles have weight average mean particle size of 6 micron or below, more preferably of 4 micron or below.

In said embodiment, preferably only 2 wt % have a particle size of 8 micron or more, more preferably of 7 micron or more.

The inorganic mineral filler may comprise a filler which has been surface-treated with an organosilane, a polymer, a carboxylic acid or salt etc. to aid processing and provide better dispersion of the filler in the organic polymer. Such coatings usually do not make up more than 3 wt. % of the filler.

Preferably, the compositions according to the present invention contain less than 3 wt. % of organo-metallic salt or polymer coatings.

The shear thinning index (SHI) is the ratio of the viscosity of the polyethylene composition at different shear stresses. In the present invention, the shear stresses at 2.7 kPa and 210 kPa are used for calculating the $SHI_{(2.7/210)}$ which may serve as a measure of the broadness of the molecular weight distribution.

Preferably, the composition has an shear thinning index $SHI_{(2.7/210)}$ of 20 or more, more preferably of 30 or more.

Furthermore, the $SHI_{(2.7/210)}$ of the composition is 150 or lower, more preferably is 120 or lower, still more preferably is 100 or lower, and most preferably is 70 or lower.

Preferably, the base resin has a density of 915 $kg/m^3$ or more, more preferably of 920 $kg/m^3$ or more, still more preferably of 930 $kg/m^3$ or more, still more preferably of 940 $kg/m^3$ or more, and most preferably of 950 $kg/m^3$ or more.

It is furthermore preferred that the base resin has a density of 965 $kg/m^3$ or less, more preferably of 960 $kg/m^3$ or less, and most preferably 950 $kg/m^3$ or less.

The composition preferably includes a copolymer of ethylene and one or more alpha-olefin comonomers, preferably of one or more $C_4$ to $C_{10}$ alpha olefin comonomers.

Preferably, the comonomer is selected from the group of 1-butene, 1-hexene, 4-methyl-1-pentene, 1-octene and 1-decene. Most preferably, the comonomer is 1-butene and/or 1-hexene.

Furthermore, it is preferred that the total amount of comonomer in the base resin is less than 2.0 mol %, more preferably less than 1 mol %, still more preferably less than 0.7 mol %, still more preferably less than 0.4 mol %, still more preferably less than 0.3 mol % and most preferably less than 0.2 mol %.

Preferably, fraction (A) of the composition is an ethylene homopolymer. Fraction (A) of the polyethylene composition preferably has a density of 950 $kg/m^3$ or higher, more preferably of 960 $kg/m^3$ or higher, and most preferably of 968 $kg/m^3$ or higher. Usually, the density of fraction (A) is 980 $kg/m^3$ or below.

Preferably, fraction (A) has an $MFR_2$ of 20 to 2000 g/10 min, more preferably of 50 to 1500 g/10 min, and most preferably of 100 to 1200 g/10 min.

Furthermore, preferably fraction (B) is an ethylene copolymer, comprising preferably one or more of the above mentioned types of comonomers.

Fraction (B) of the composition preferably comprises at least 0.35 mol %, more preferably at least 0.55 mol %, and still more preferably at least 0.75 mol % of one or more of the above mentioned types of comonomers.

Fraction (B) of the polyethylene composition preferably has a density of 922 $kg/m^3$ or higher, more preferably of 924 $kg/m^3$ or higher, and most preferably of 927 $kg/m^3$ or higher.

Furthermore, fraction (B) preferably has a density of 940 $kg/m^3$ or below.

In the composition used for the pipe according to the invention, preferably the weight ratio of fractions (A):(B) in the base resin is 60:40 to 40:60, more preferably is 58:42 to 42:58, and most preferably is from 56:44 to 44:56.

In the polyethylene composition the ratio of $MFR_2$ of fraction (A) to $MFR_5$ of the base resin is preferably 10 or higher, more preferably 50 or higher, more preferably is from 100 to 10000.

Preferably, the base resin is consisting of fractions (A) and (B).

The pressureless pipe of the invention may be of any desired design. Preferred pipes are solid wall pipes with an inner diameter of at most 600 mm, more preferably at most 500 mm, and most preferably at most 400 mm. Further preferred pipes are structured wall pipes such as corrugated-wall pipes, preferably of a diameter of 3 m or below.

Particularly preferred are twin wall/multilayer-wall pipes with hollow sections with diameters of at most 1000 mm, more preferably at most 800 mm, and most preferably at most 600 mm.

As a particular example of a pressureless pipe may be mentioned road culverts. Preferably, such road culverts have a diameter of 0.6 to 3 m.

As mentioned, the pipe of the invention may be used for various purposes such as for drainage and for cable and pipe protection. The term "drainage" comprises land and road drainage, storm water transport, and indoor soil and waste discharge (indoor sewage).

The pressureless pipe of the invention may preferably be produced by extrusion in a pipe extruder. After the extruder, the pipe is taken off over a calibrating sleeve and cooled. The pipe can also be manufactured in an extrusion winding process in diameters of 2 to 3 m or more. The pipe can also be processed in a corrugation device in combination with or close to the calibration step, e.g. for the manufacture of multilayer pipes of corrugated twin-wall or multilayer-wall design, with or without hollow section, or multilayer pipes with ribbed design.

Pipe parts such as valves, chambers, etc., are prepared by conventional processes such as injection moulding, blow moulding etc.

Where herein features of fractions (A) and/or (B) of the composition of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/ diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

The polyethylene composition according the invention preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Further, the polyethylene base resin preferably is an "in-situ"-blend. Such blends are preferably produced in a multistage process. However, an "in-situ"-blend may also be produced in one reaction stage by using two or more different kinds of catalyst.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage. The order of the stages may, however, also be reversed.

Optionally and advantageously, the main polymerisation stages may be preceded by a prepolymerisation, in which case up to 20% by weight, preferably 1 to 10% by weight, more preferably 1 to 5% by weight, of the total base resin is produced. The prepolymer is preferably an ethylene homopolymer (HDPE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst.

The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture.

It is preferred that the multimodal base resin of the polyethylene composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

The composition preferably if produced in a process comprising a compounding step, wherein the composition of the base resin, i.e. the blend, which is typically obtained as a base resin powder from the reactor, is extruded in an extruder and then pelletised to polymer pellets in a manner known in the art.

Preferably, in this extrusion step the filler and, optionally, other additives or other polymer components can be added to the composition in the amount as described above.

The extruder may be e.g. any conventionally used compounding or extruder unit, preferably is a co-rotating or counter-rotating twin screw extruder, or an internal mixer such as a Banburry type mixer or a single screw extruder such as a Buss co-kneader or a conventional single screw extruder. Static mixers such as Kenics, Koch, etc. can also be used in addition to the compounding or extruder units mentioned in order to improve the distribution of the filler in the polymer matrix.

Still further, the present invention relates the use of a polyethylene composition as described hereinbefore for the production of a pipe, in particular a pressureless pipe.

FIG. 1 shows the sample and the notch to be applied on the sample for the CTL test.

EXAMPLES

1. Definitions and Measurement Methods a) Density

Density is measured according to ISO 1183/ISO 1872-2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

c) Rheological Parameters

Rheological parameters such as Shear Thinning Index SHI and Viscosity are determined by using a rheometer, preferably a Anton Paar Physica MCR 300 Rheometer. The definition and measurement conditions are described in detail on page 8 line 29 to page 11, line 25 of WO 00/22040.

d) Constant Tensile Load (CTL)

The CTL test is done with reference to ISO 6252-1992 (E), with the notch according to ASTM 1473, in the following way:

The CTL test is a test for accelerated slow crack growth where the acceleration is maintained by elevated temperature of 60° C. The testing is performed in a surface active solution and the incorporation of a notch both accelerates the time to failure and ensures a plain strain in the samples.

The stress in the samples was 5.0 MPa (actual stress in the notched region). The surfactant used in the test was IGEPAL CO-730 at a temperature of 60° C.

The samples are prepared by pressing a plaque with a total length of 125 to 130 mm and a width at its ends of 21+−0.5 mm. The plaque then is milled into the correct dimensions in a fixture on two of the sides with a centre distance of both holders of 90 mm and a hole diameter of 10 mm. The central part of the plaque has a parallel length of 30+−0.5 mm, a width of 9+−0.5 mm, and a thickness of 6+−0.5 mm.

A front notch of 2.5 mm depth is then cut into the sample with a razor blade fitted into a notching machine (PENT-NOTCHER, Norman Brown engineering), the notching speed is 0.2 mm/min. On the two remaining sides side grooves of 0.8 mm are cut which should be coplanar with the notch. After making the notches, the sample is conditioned in 23+−1° C. and 50% relative humidity for at least 48 h. The samples are then mounted into a test chamber in which the active solution (10% water solution IGEPAL CO-730, chemical substance: nonyl phenyl polyethylene glycol ether) is kept. The samples are loaded with a dead weight and at the moment of breakage an automatic timer is shut off.

The sample and the notch to applied to the sample are shown in FIG. 1, in which:
A: total length 125 to 130 mm
B: width at ends 21+/−0.5 mm
C: centre distance between holders 90 mm
D: parallel length 30+/−0.5 mm
E: width of narrow parallel part 9+/−0.5 mm
F: hole diameter 10 mm
G: main notch 2.5+/−0.02 mm
H: side grooves 0.8 mm
I: thickness of plaque 6+/−0.2 e) Weld Strength

Weld strength was measured in accordance with DVS 2203, Teil 4 (tensile test), and is given as ratio of the strength of the welded material to the unwelded material.

As another measure of the properties and quality of the weld the strain at break is recorded during the measurement according to DVS 2203, Teil 4 (tensile test), given as a ratio of the strain at break of the welded to the unwelded material.

f) Charpy Impact Strength

Charpy impact strength was determined according to ISO 179/1eA on V-notched samples at 23° C. (Charpy impact strength (23° C.)) and 0° C. (Charpy impact strength (0° C.)).

g) Creep Resistance

The short term creep ratio was measured in a four point bending mode according to DIN-Certco ZP 14.3.1 (former DIN 54852-Z4) at 1 min and 200 h. The long term creep ratio (pipe specimens) was determined according to ISO 9967.

h) Flexural Modulus

Flexural modulus was determined according to ISO 178.

2. Production of Polymer Compositions and Pipes

Base resins were produced in a multistage reaction comprising a first (pre)-polymerisation stage in slurry in a 50 $dm^3$ loop reactor, followed by transferring the slurry to a 500 dm$^3$ loop reactor wherein polymerisation was continued in slurry to produce the low molecular weight component, and a second polymerisation in a gas phase reactor in the presence of the product from the second loop reactor to produce the comonomer containing high molecular weight component. As comonomer, hexene-1 has been used.

As a catalyst, the supported catalyst as used in the examples of EP 1 137 707 was used.

The polymerisation conditions applied are listed in Table 1.

TABLE 1

|  | Base resin 1 | Base resin 2 | Base resin 3 |
|---|---|---|---|
| Prepol. T/° C. | 70 | 70 | 70 |
| Prepol. H$_2$ feed | 4.9 | 4.6 | 4.6 |
| Prep. C$_4$/C$_2$ feed ratio | 0 | 0 | 0 |
| Loop T/° C. | 95 | 95 | 95 |
| Loop pressure/bar | 60 | 60 | 60 |
| Loop C$_2$ conc. | 6.7 | 6.9 | 6.4 |
| Loop H$_2$/C$_2$ | 580 | 605 | 605 |
| MFR$_2$/g/10 min | 1100 | 930 | 1000 |
| Loop-Density | homopol. | homopol. | homopol. |
| GPR T/° C. | 85 | 85 | 85 |
| GPR C$_2$ conc. | 6 | 10 | 9 |
| H$_2$/C$_2$ | 15 | 32 | 28 |
| C$_6$/C$_2$ | 33 | 7 | 17 |
| Split | 3/44/53 | 2/44/54 | 2/44/54 |
| density/kg/m$^3$ | 952.1 | 957 | 954.2 |
| comonomer/wt. % | 0.72 | 0.24 | 1.1 |

The compositions were compounded/melt homogenized in a Buss Co-Kneader 100 MDK/E-11L/D. Polymer and additives (pellets and/or powder) were fed into the first mixer inlet of the Buss Co-Kneader which is a single screw extruder with a downstream discharge single screw extruder with a pelletizing unit cutting pellets in the molten stage and cooled via water. The mixer temperatures were set to 200 to 240° C., from first inlet to outlet, screw temperature to 210° C. and the discharge extruder to around 230° C. The mixer screw RPM was 170 to 190 rpm and the throughput 100 to 150 kg/h. The filler, as specified above, was fed into the molten polymer in the second mixer inlet downstream.

Composition 1 and Composition 2 were produced by compounding base resin 1 and base resin 2, respectively, with 20 wt. % of talc. Composition 3a was produced by compounding base resin 3 with 10 wt. % of talc and Composition 3 b was produced by compounding base resin 3 with 40 wt. % of CaCO$_3$. The results are given in Table 2.

The talc used as a filler had a weight average mean particle size of 5 microns with only 2 wt % having a particle size of 20 micron or higher, and a purity of 98% Mg-silicate.

The CaCO$_3$ used had a weight average mean particle size of 1.5 microns and only 2 wt % had a particle size of 8 micron or above, and a purity of 98.5% CaCO$_3$.

Pipes were produced by feeding the composition/base resin in pellet form into a conventional Cincinnati pipe extruder for extrusion with a line speed around 1 m/min into diameter 110 mm pipes with a wall thickness of 4 mm.

The extruders for producing the pipes can be standard pipe extruders, such as single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

After leaving the annular die, the pipe is taken off over a calibrating mandrel, usually accompanied by cooling of the pipe by air cooling and/or water cooling, optionally also with inner water cooling.

In the production of multilayer pipes conventional extruders are suitable. For example, the polyolefin layers may be manufactured with single screw extruders with an L/D of 20 to 40 or twin screw extruders or other types of extruders suitable for multilayer extrusion, as described for example in U.S. Pat. No. 5,387,386 and FI 83 184. Optionally, a melt pump and/or a static mixer can be used additionally between the extruder and the ring die head. Ring shaped dies with diameters ranging from approximately 20 to 2000 mm and even greater are possible. Advantageous die temperatures for discharging the melt are 180° C. to 240° C., preferably 200° C. to 240° C. After leaving the ring-shaped die, the polyolefin multilayer plastic pipes are taken off over a calibrating sleeve and cooled.

The multilayer pipe can also be manufactured in extrusion winding processes in diameters up to 3 to 4 meters or even larger.

The pipes may also be processed in corrugating devices in combination or close to the calibration step, for example for manufacturing of multilayer pipes of corrugated double/triple wall design with or without hollow sections or multilayer pipes with ribbed design.

Melt homogenisation and pipe production can also be made in one step without an intermediate solidification and pelletisation step, e.g. combined twin-screw extruder for both compounding and manufacturing of pipes.

TABLE 2

|  |  | Comp. 1 | Comp. 2 | Comp. 3 a | Comp. 3 b | Base Resin 1 | Base Resin 2 | Base Resin 3 |
|---|---|---|---|---|---|---|---|---|
| eta(2.7 kPa) | Pas | 292 | 276 | 212 | 490 | 200.6 | 197 | 199 |
| SHI(2.7/210) |  | 51.9 | 45.3 | 44.2 | 44.3 | 55.3 | 45.3 | 41.5 |
| eta(747 Pa) | Pas | 566 | 582 | 427 | 869 | 478 | 490 | 567 |
| eta(368 Pa) | Pas | 706 | 726 | 549 | 1060 | 518 | 500 | 592 |
| FRR$_{21/5}$ |  | 39.97 | 40.22 | 35.57 | 40.51 | 39.5 | 37.2 | 35.9 |
| MFR$_5$ | g/10 min | 0.27 | 0.24 | 0.27 | 0.23 | 0.28 | 0.26 | 0.24 |
| MFR$_{21}$ | g/10 min | 10.9 | 9.5 | 9.63 | 9.42 | 11.05 | 9.49 | 8.48 |
| CTL/time to failure | h | 426 | 12 | 51 | 53 | 1055 | 12 | 52 |
| flexural modulus | MPa | 2056 | 2306 | 1604 | 2166 | 1312 | 1507 | 1402 |
| Charpy impact str. (23° C.) | kJ/m$^2$ | 5.9 | 4.3 | 8.0 | 53.9 | 20.1 | 17.0 | 17.8 |
| Charpy | kJ/m$^2$ | 5.6 | 4.5 | 5.0 | 32.8 | 14.1 | 13.2 | 14.2 |

TABLE 2-continued

|  |  | Comp. 1 | Comp. 2 | Comp. 3 a | Comp. 3 b | Base Resin 1 | Base Resin 2 | Base Resin 3 |
|---|---|---|---|---|---|---|---|---|
| impact str. (0° C.) |  |  |  |  |  |  |  |  |
| Creep modulus | | | | | | | | |
| after 1 min | MPa | 2188 | 2675 | 1869 | 2918 |  |  | 1567 |
| after 24 h | MPa | 923 | 1159 | 777 | 1326 |  |  | 612 |
| after 200 h | MPa | 619 | 815 | 565 | 907 |  |  | 433 |
| long term creep ratio |  | 3.24 | 3.54 | 3.24 | 3.48 |  |  | 3.55 |
| short term creep ratio |  | 3.53 | 3.28 | 3.31 | 3.22 |  |  | 3.61 |

The invention claimed is:

1. A pressureless pipe or a supplementary pipe article for pressureless pipes comprising a polyethylene composition comprising a base resin which comprises
   (A) a first ethylene homo- or copolymer fraction, and
   (B) a second ethylene homo- or copolymer fraction, wherein fraction (A) has a lower average molecular weight than fraction (B), the base resin has a flexural modulus determined according to ISO 178 of 1000 MPa or higher, and the composition further comprises
   (C) an inorganic mineral filler,
   wherein inorganic mineral filler (C) is present in the composition in an amount of 1 to 70 wt. %; and
   wherein the inorganic mineral filler (C) is selected from the group consisting of talc, an oxide of aluminum, an oxide of magnesium, an oxide of calcium, an oxide of barium, a hydroxide of aluminum, a hydroxide of magnesium, a hydroxide of calcium, a hydroxide of barium, a carbonate of aluminum, a carbonate of magnesium, a carbonate of calcium, a carbonate of barium, and mixtures thereof.

2. A pressureless pipe or a supplementary pipe article for pressureless pipes according to claim 1 wherein the composition has a flexural modulus determined according to ISO 178 of more than 1400 MPa.

3. A pressureless pipe or a supplementary pipe article for pressureless pipes according to claim 1 wherein the composition has a time to failure in the Constant Tensile Load test of 1.5 hours or more.

4. A pressureless pipe or a supplementary pipe article for pressureless pipes according to claim 1 wherein the composition preferably has a creep resistance measured as the creep ratio E(1 hour)/E(2 years) of 4.5 or below.

5. A pressureless pipe or a supplementary pipe article for pressureless pipes according to claim 1 wherein the composition has a weld ratio of the weld strength of a welded portion with respect to that of the full material of at least 0.5.

6. A pressureless pipe or a supplementary pipe article for pressureless pipes according to claim 1 wherein the composition has a weldability measured as the ratio of strain at break of the welded portion with respect to that of the full material of higher than 0.2.

7. A pressureless pipe or a supplementary pipe article for pressureless pipes according to claim 1 wherein the base resin has a density of 915 kg/m$^3$ to 950 kg/m$^3$.

8. A pressureless pipe or supplementary pipe article for pressureless pipes according to claim 1 wherein fraction (A) is an ethylene homopolymer.

9. A pressureless pipe or a supplementary pipe article for pressureless pipes according to claim 1 wherein fraction (B) is an ethylene copolymer comprising at least one alpha-olefin comonomer having at least 4 carbon atoms.

10. A pressureless pipe or a supplementary pipe article for pressureless pipes according to claim 1 wherein fraction (A) has an MFR$_2$ of 20 to 2000 g/10 min.

11. A pressureless pipe or a supplementary pipe article for pressureless pipes according to claim 1 wherein the weight ratio of fractions (A):(B) in the base resin is in the range of 60:40 to 40:60.

12. A pressureless pipe or a supplementary pipe article for pressureless pipes according to claim 1, wherein the inorganic mineral filler (C) is present in the amount of from at least 12 wt % to at most 25 wt %.

13. A pressureless pipe or a supplementary pipe article for pressureless pipes according to claim 1 wherein the composition has an MFR$_5$ of 0.1 to 2.0 g/10 min.

14. A pressureless pipe or a supplementary pipe article for pressureless pipes according to claim 13 wherein the composition has a flexural modulus determined according to ISO 178 of more than 1400 MPa.

15. A pressureless pipe or a supplementary pipe article for pressureless pipes according to claim 13 wherein the composition has a time to failure in the Constant Tensile Load test of 1.5 hours or more.

16. A pressureless pipe or a supplementary pipe article for pressureless pipes according to claim 13 wherein the composition preferably has a creep resistance measured as the creep ratio E(1 hour)/E(2 years) of 4.5 or below.

17. A pressureless pipe or a supplementary pipe article for pressureless pipes according to claim 1 wherein the composition includes a copolymer of ethylene and one or more alpha-olefin monomers.

18. A pressureless pipe or a supplementary pipe article for pressureless pipes according to claim 17 wherein the amount of comonomer in the base resin is less than 2.0 mol %.

19. A polyethylene composition adapted for the production of a pressureless pipe or a supplementary pipe article for pressureless pipes comprising a base resin which comprises
   (A) a first ethylene homo- or copolymer fraction, and
   (B) a second ethylene homo- or copolymer fraction, wherein fraction (A) has a lower average molecular weight than fraction (B), the base resin has a flexural modulus determined according to ISO 178 of 1000 MPa or higher, and the composition further comprises
   (C) an inorganic mineral filler,
   wherein inorganic mineral filler (C) is present in the composition in an amount of 1 to 70 wt. % for the production of a pipe or a supplementary pipe article; and
   wherein the inorganic mineral filler (C) is selected from the group consisting of talc, an oxide of aluminum, an oxide of magnesium, an oxide of calcium, an oxide of barium, a hydroxide of aluminum, a hydroxide of magnesium, a hydroxide of calcium, a hydroxide of barium, a carbonate of aluminum, a carbonate of magnesium, a carbonate of calcium, a carbonate of barium, and mixtures thereof.

20. A polyethylene pressureless pipe comprising a base resin which includes
(A) a first ethylene homo- or copolymer fraction, and
(B) a second ethylene homo- or copolymer fraction, wherein fraction (A) has a lower average molecular weight than fraction (B), the base resin has a flexural modulus determined according to ISO 178 of 1000 MPa or higher, and the composition further comprises
(C) an inorganic mineral filler,
wherein inorganic mineral filler (C) is present in the composition in an amount of 1 to 70 wt. %; and
wherein the inorganic mineral filler (C) is selected from the group consisting of talc, an oxide of aluminum, an oxide of magnesium, an oxide of calcium, an oxide of barium, a hydroxide of aluminum, a hydroxide of magnesium, a hydroxide of calcium, a hydroxide of barium, a carbonate of aluminum, a carbonate of magnesium, a carbonate of calcium, a carbonate of barium, and mixtures thereof.

* * * * *

UNITED STATES PATENT AND TRADEMARK OFFICE
CERTIFICATE OF CORRECTION

PATENT NO.      : 8,372,499 B2
APPLICATION NO. : 12/064088
DATED           : February 12, 2013
INVENTOR(S)     : Ek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this
First Day of September, 2015

Michelle K. Lee
*Director of the United States Patent and Trademark Office*